Figure 1:
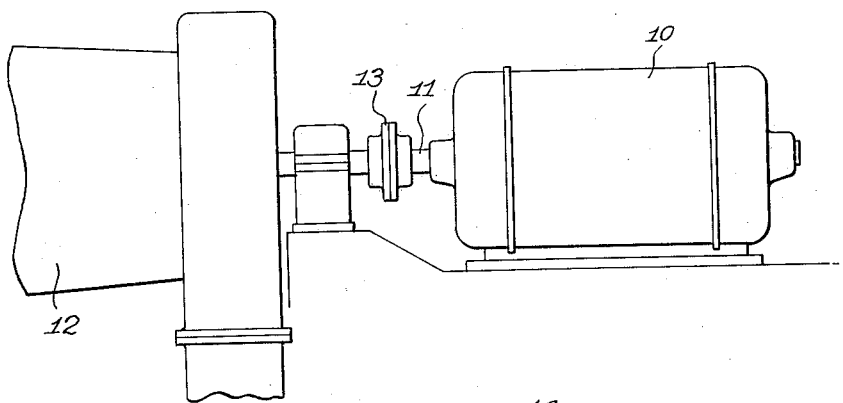

Jan. 30, 1945.  C. A. ADAMS  2,368,608

HIGH SPEED DIRECT CURRENT GENERATOR

Filed July 31, 1942

INVENTOR
Comfort A. Adams

BY John P. Jarbox
ATTORNEY

Patented Jan. 30, 1945

2,368,608

UNITED STATES PATENT OFFICE 2,368,608

HIGH-SPEED DIRECT-CURRENT GENERATOR

Comfort A. Adams, Philadelphia, Pa., assignor to Edward G. Budd Manufacturing Company, Philadelphia, Pa., a corporation of Pennsylvania Application July 31, 1942, Serial No. 453,077

10 Claims. (Cl. 171—228)

This invention relates to direct current generators and particularly to direct current generators of the high speed type adapted for use with turbines.

The use of generators in combination with turbines has been general in the industry, particularly in connection with steam turbines. For reasons of efficiency, it is found desirable to connect the generator directly to the turbine to eliminate reduction gearing, and such connection has been generally successful in the case of alternating current generators. However, in the case of direct current generators, there are certain problems involved which offer considerable difficulty of solution.

One of these problems arises from the relatively high voltages developed between adjacent commutator segments in a high speed direct current generator of large capacity. This segment voltage is roughly proportional to the product of R. P. M. and the kilowatt output, and is a fair measure of the difficulties encountered in so designing the generator as to avoid serious sparking and the danger of flash-over or complete short circuit between adjacent brushes. Since such a flash-over would put the generator completely out of commission for an appreciable time, to say nothing of the cost of repairs, this possibility must be completely eliminated in a successful design. In machines of conventional design the commonly accepted criterion is that this mean segment voltage should not exceed 25 or possibly 30. This means an upper limit of the product of R. P. M. and the kw. output of somewhere between one million and two million. The latter figure is actually higher than for any successful D. C. generator ever built, whereas this invention covers the design of a machine for which this product may be as high as ten million. Even when such a highspeed D. C. generator may operate satisfactorily under a steady load, equal to or somewhat greater than its rating, it is possible that some transient surge may cause a temporary flash at the trailing edge of a brush that would cause an unusual volume of ionized gases or of copper vapor. These ionized gases are fairly good conductors and form a conducting path between adjacent segments. The coil which connects the two adjacent segments which have just passed out from under the brush is normally in a very weak field and therefore generating a low voltage which may not be sufficient to maintain a short circuit through the ionized gases which are present at that point. But as soon as this coil gets into the fringe of magnetic flux from the leading pole tip its voltage will be sufficient to maintain a short circuit between these segments, which will then increase as the coil gets under the main poles and will carry around to the next brush. This in fact is the mechanism of flash-over. The danger obviously increases with the mean volts per segment and is otherwise dependent upon the strength of the magnetic field in which a coil finds itself immediately or shortly after the two segments, to which its ends are connected, have left the brush. In other words it is a question as to the persistence or carry-over of the ionized gases beyond the trailing edge of the brush to a point where the voltage generated in the coil is sufficient to cause a short circuit between the two segments and through the ionized gases. This invention is aimed at the elimination of this danger, even when the mean volts per segment may be as high as 75.

Another problem of high speed direct current generators lies in the failure to secure sufficiently complete neutralization of the reactance voltage arising from the reversal of current in the short circuited armature windings at the point of commutation. In the case of large generators at very high speeds, the reactance voltage increases to a considerable value which, in the case of locomotive use, may be as high as 50 volts. In any case, the reactance voltage must be largely neutralized by a voltage induced in a short circuit coil by cutting the flux under the commutation pole. Thus since the reactance voltage is directly proportional to the armature current the flux from the commutating pole should also be directly proportional thereto. It is on this account that the commutating pole excitation is supplied by the armature current. Unfortunately the commutating pole flux is not exactly proportional to this exciting current, particularly in the upper part of the range where saturation sets in. In other words the saturation curve of the commutating pole magnetic circuit is not a straight line but may deviate considerably therefrom at full load. Thus if the compensation is perfect on the lower or straight part of the saturation curve it will fall short of complete compensation on the upper part of the curve and in the degree that saturation of the commutating pole causes the curve to fall below the straight line.

Since the unbalanced part of the reactance voltage should not exceed about 1.25 volts which is about two per cent of the full load reactance voltage of a machine such as here contemplated, it is obviously necessary to employ a design which will yield a much straighter saturation curve than is possible with the conventional designs even for the largest present combination of speed and rating, where the saturation curve may deviate as much as ten per cent from the straight line, owing to the fact that the maximum reactance voltage in such cases is about one-fifth of that contemplated by this invention.

The general object of the present invention is therefore to provide a type of design and construction for a direct current generator of large capacity and high speed, such that said generator will operate satisfactorily without encountering the serious difficulties of commutation and flash-over heretofore associated with such combinations of speed and rating.

This general object may be subdivided as follows:

(1) To greatly reduce the tendency to spark by an unusually accurate neutralization of the reactance voltage throughout the full range of specified load or overload.

(2) To eliminate the possibility of a flash-over even should a spark be produced by some abnormal and transient condition in the system.

Related objects are to provide means for dissipating gases of ionization on the commutator surface, to increase the point of saturation of the commutating pole arising primarily from large field pole leakage flux, and to reduce the curvature at saturation of the normal commutating pole saturation curve.

Figure 2:
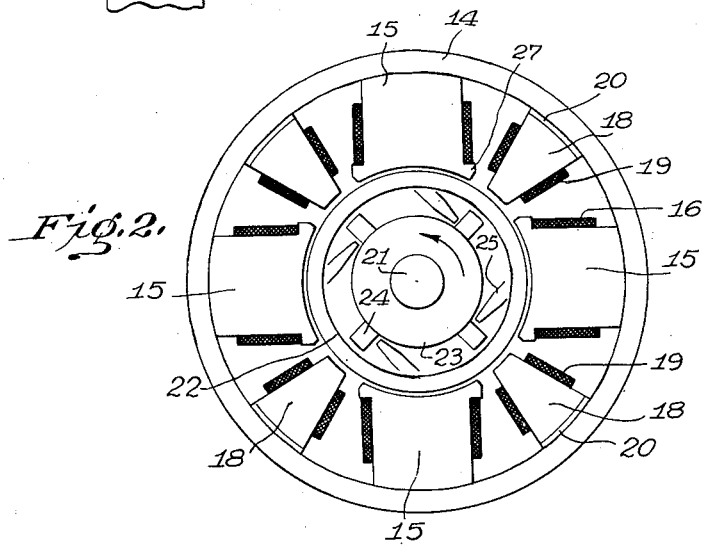
Figure 3:
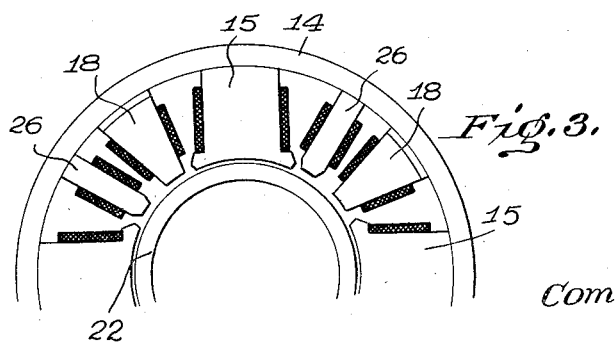

Further objects, including those related to features of structure, will become apparent on consideration of the following description of the modification of the invention which may be preferred in connection with the accompanying drawing, in which Figure 1 is a view in elevation of a generator directly connected to a gas turbine;

Figure 2 is an elevation of the commutator side of a direct current generator incorporating the subject matter of my invention, and Figure 3 is a detail showing an additional flux control pole.

In Figure 1 of the drawing, there is indicated a generator applied directly to a gas turbine, the generator 10 having its shaft 11 connected to the shaft of the turbine 12 through a flexible connector 13 of conventional type.

The generator as disclosed takes the usual cylindrical form having a combined yoke and casing 14, to which are attached the various field poles 15. In this specific disclosure there are indicated four field poles, as this number makes possible several practical advantages over a 2-pole machine, such as a thinner yoke, a smaller overall diameter, and a considerable saving in weight. However, a 2-pole machine may be preferable in some cases. The field poles 15 carry the usual field coils 16 as shown. Also, it may be desirable in some instances to introduce compensating windings in the field pole faces.

Positioned intermediate the field poles are the various commutating poles 18 with the associated commutating pole windings 19. It is important to observe in connection with these commutating poles that the same are tapered from the yoke toward the armature of the generator to increase the point of saturation, as will hereinto be more fully described. Interposed between the commutating poles 18 and the yoke 14 are spacing plates 20 of a material having a reduced permeability with reference to the iron of the commutating poles, such material as copper or zinc being found satisfactory. Rotatable within the inner ends of the poles on armature shaft 21 is the armature 22, provided with commutator 23 and the four brushes 24 uniformly spaced about the commutator. In close proximity to the trailing edge of the brushes 24, in accordance with the direction of rotation as indicated by the arrow, are a group of nozzles 25, each of which having connection to a source of air or other gas under pressure so that, with the manipulation of proper valves, compressed gases may be forced at a high velocity against the trailing edge of the various brushes of the commutator. These nozzles may take any desirable form, as, for example, a flat chamber having an elongated aperture extending the width of the commutator brushes and converging toward the supply conduit.

As previously stated, one important difficulty to be overcome in high speed direct current generators is the reduction as far as possible of under-compensation of the reactance voltage at maximum load. One expedient which is effective to this end is the shaping of the commutating pole roughly as a wedge with the transverse sides inclining toward a truncated tip adjacent the armature. The specific object of this construction is to provide an increased magnetic path for the considerable magnetic leakage flux from the adjacent field pole of opposite polarity. The resulting commutating pole flux increases in a direction moving outwardly from the pole tip, and hence the wedge form of the commutating pole provides the necessary needed increment of path area. Consequently, the saturation point on the saturation curve of the commutating pole and the corresponding point of under compensation of the reactance voltage is increased so that sparkless commutation is made possible in the higher current ranges.

Accessory to the tapered form of commutating pole in reducing the degree of under compensation at high speeds is the introduction into the pole magnetic circuit of the shim or plate 20 having a relatively low permeability.

Without this plate, the saturation curve of the commutating pole has a sharper bend or knee when saturation begins. To avoid a sharp reduction of the compensating voltage at the saturation bend of the curve, it is desirable to straighten the curve at this point as far as possible without too large reduction in the straight line slope. This may be accomplished by inserting one or more plates 20, as indicated, thus superimposing a straight line curve on the normal curve, the resultant curve taking on a flatter curvature at the saturation point.

Having reduced the tendency to spark by the tapered commutating pole and the reduced permeability flux path, the other inventive features cooperate to reduce the possibility of injurious flash-over, should an ionizing spark form at the brushes.

One means to this end is the construction of the field poles so that the gap between the commutating pole and the leading field pole tip is substantially increased. In ordinary direct current generator construction, the field pole surface subtends an arc of about 66.7% on the average, of the pole pitch, with a minimum of about 65%. It has been found effective in reducing flash-over to reduce the percentage of pole surface to pole pitch to under 62% and preferably to 60%. This spread increases the free path on the commutator of an ionization cloud to such a length that complete dissipation of the cloud may occur before appreciable voltage develops in the short circuited coils.

Another means effective for dissipation of the ionization cloud is the air blast which, in conjunction with wide spread field poles, so distributes the gases as to eliminate for all practical purposes the possibility of a flash-over.

It is pointed out particularly that the various described features, namely, the commutating pole shape, the commutating pole plate, the wider spread field poles, and the air blast are intimately and cooperatively associated to make possible an operative high speed direct current generator of large capacity, in the sense that they combine to eliminate destructive flash-over. Each feature is effective to this end, but the combination of at least the first three named features seem practically essential to operation of a direct current generator at speed in excess of 2,500 revolutions per minute, and for capacity ratings, greater than 1,000 kilowatts.

Various modifications of the invention as described may be made as, for example, the employment of two armature windings on the same core with a commutator on each end, or of a double armature in order to reduce the reactance voltage, and the mean volts per segment, but such a construction would materially increase the weight, cost, and space requirements of the generator. Also, I may use a second auxiliary pole 26, as shown in Figure 3, interposed between the commutating pole 18 and leading tip 27 of the succeeding field pole 15. This pole 26 may be provided with sufficient excitation either by shunt and/or series connection to the armature circuit, to eliminate practically the magnetic fringe of the leading field pole tip and thus increase the effective path for dissipation of ionized gases.

The described construction makes possible a generator having a weight approximately one-half that of the conventional geared generator with a consequent saving of approximately five pounds per rail horsepower when used in conjunction with a gas turbine type of locomotive.

Stated quantitatively, the usual measure of commutation capacity is the product of the kilowatt capacity and the revolutions per minute, the usual limit for direct current generator commutators being about 1½ million. Utilizing the features of the invention hereinabove described, applicant is enabled to increase the commutation capacity to approximately 10 million.

Modifications of the invention other than hereinabove described may, of course, be made, and therefore limitations should not be made upon the scope of the invention other than as required by the claims hereto appended.

What is claimed is:

1. In a high speed direct current electric generator, the combination of a supporting frame, a yoke, field poles attached to said yoke, commuting poles positioned between said field poles, a rotatable armature, a commutator for said armature, and brushes for said commutator, said field poles having a pole arc of not over 62% of the pole pitch.

2. The combination of claim 1, in which the commutating poles have a wedge shape, the sides of the poles parallel to the armature axis being divergent therefrom.

3. In a high speed direct current electric generator, the combination of a supporting frame, a yoke, field poles connected to said yoke, commutating poles positioned between said field poles, a rotatable armature, a commutator for said armature, brushes for said commutator, and means for dissipating gases formed on the commutator at the trailing edges of said commutator brushes, said field poles having a pole arc of less than 62% of the pole pitch, and said commutating poles diverging outwardly from the armature axis.

4. The combination of claim 3, but including means interposed in the normal magnetic commutating pole circuit of the generator for increasing the reluctance of said circuit.

5. In a high speed direct current electric generator, the combination of a supporting frame, a yoke, field poles attached to said yoke, commutating poles positioned between said field poles, a rotatable armature, a commutator for said armature, and brushes for said commutator, said commutating poles having a shape roughly as a truncated wedge with the base adjacent the yoke and the sides in planes parallel to the armature axis.

6. In a high speed direct current electric generator, the combination of a supporting frame, a yoke, field poles attached to said yoke, commutating poles positioned between said field poles, a rotatable armature, a commutator for said armature, and brushes for said commutator, said commutating poles having a conformation effective to increase continuously the magnetic flux carrying capacity thereof moving outwardly from the pole tip to the pole base.

7. In a high speed direct current electric generator, the combination of a supporting frame, a yoke, field poles attached to said yoke, commutating poles positioned between said field poles, a rotatable armature, a commutator for said armature, and brushes for said commutator, said commutating poles having a thickness in a direction transverse to the armature axis which increases in a direction outward from the armature axis.

8. In a high speed direct current electric generator, the combination of a supporting frame, a yoke, field poles attached to said yoke, commutating poles positioned between said field poles, a rotatable armature, a commutator for said armature, and brushes for said commutator, said commutating poles having a thickness in a direction transverse to the armature axis which increases in a direction outward from the armature axis, and means accessory to the commutating magnetic circuit for reducing the normal curvature of the saturation curve of said circuit.

9. In a high speed direct current electric generator, the combination of a supporting frame, a yoke, field poles attached to said yoke, commutating poles positioned between said field poles, a rotatable armature, a commutator for said armature, and brushes for said commutator, said commutating poles having a thickness in a direction transverse to the armature axis which increases in a direction outward from the armature axis, means accessory to the commutating magnetic circuit for reducing the normal curvature of the saturation curve of said circuit, and means for dissipating gases formed at the trailing edges of the commutator brushes.

10. In a high speed direct current electric generator, the combination of a supporting frame, a yoke, field poles attached to said yoke, commutating poles positioned between said field poles, a rotatable armature, a commutator for said armature, brushes for said commutator, and means interposed in the normal magnetic commutating pole circuit of the generator for increasing the reluctance of said circuit, the arc of each of said field poles being less than 62 percent of the pole pitch and the commutating poles increasing in width outwardly in a plane at right angles to the armature shaft.

COMFORT A. ADAMS.